Oct. 29, 1968

C. C. TETZLAFF ETAL 3,407,448

HOSE CLAMP WITH HOSE-ATTACHING MEANS

Filed March 3, 1967

INVENTORS
CLARENCE C. TETZLAFF
GEORGE CHAMBERLAIN
BY Silverman & Cass
ATTORNEYS

Oct. 29, 1968 C. C. TETZLAFF ETAL 3,407,448
HOSE CLAMP WITH HOSE-ATTACHING MEANS
Filed March 3, 1967 2 Sheets-Sheet 2

INVENTORS
CLARENCE C. TETZLAFF
GEORGE CHAMBERLAIN
BY Silverman & Cass
ATTORNEYS

United States Patent Office 3,407,448
Patented Oct. 29, 1968

3,407,448
HOSE CLAMP WITH HOSE-ATTACHING MEANS
Clarence C. Tetzlaff, River Forest, and George Chamberlain, Cicero, Ill., assignors to Wittek Manufacturing Company, Chicago, Ill., a corporation of Illinois
Filed Mar. 3, 1967, Ser. No. 620,472
13 Claims. (Cl. 24—19)

ABSTRACT OF THE DISCLOSURE

A hose clamp of the type which has a metal strap or band adapted to be constricted about a hose to secure the hose to a pipe by taking up a screw in a conventional manner, in which there is a pair of prongs or tines secured to the band and extending laterally thereof, each prong or tine including a reverse bent bight spaced from the edge of the band by a distance which is the desired axial distance that the clamp is to be located from the said hose end when installed. Each prong has a free-ended extension which is adapted to overlie the inner surface of the hose adjacent its end and is further provided with a piercing tip bent normal to the extension, adapted to be pressed into the interior wall of the hose radially to lock the hose clamp in position on the hose. The length of the free-ended extension is less than the distance from the band edge to the bight so that the hose wall is not pierced in the annular pressure part that is engaged by the band and is being constricted. A preferred construction has the pair of prongs or tines integral with a load-diffusing member as a part of a radial screw type of hose clamp.

Cross-reference to related applications

The preferred form of the invention is a construction which is based upon a radial screw hose clamp having a load diffusing member, the prongs described hereinafter being integral with the load diffusing member and serving to space the hose clamp properly from the end of the hose when the hose clamp is properly installed. The radial screw hose clamp with a load diffusing member is disclosed in a copending application identified as follows:

Clarence Tetzlaff application Ser. No. 447,014, filed Apr. 9, 1965, and entitled "Hose Clamp With Load Distributing Member." The radial screw hose clamp with a load diffusing member and having simple spacing means integral with the load diffusing member is disclosed in a second copending application identified as follows:

Clarence Tetzlaff application Ser. No. 549,980, filed May 13, 1966, and entitled "Hose Clamp With Load Distributing Member."

Clarence Tetzlaff, named in both of the above identified copending applications is one of the applicants herein.

A hose clamp with hose-attaching means of a structure which enables the hose clamp properly to be secured to and positioned relative to the end of the hose is disclosed in a third copending application filed by the same applicants as named herein and identified as follows:

George Chamberlain and Clarence C. Tetzlaff application Ser. No. 620,473, filed Mar. 3, 1967, and having the same title as this application.

The structure of the third application is characterized by the provision of a wire clip or bracket secured to the hose clamp, the clip having one or more sharp prongs which enter the end wall of the hose axially.

All of the above applications as well as this one are owned by a common assignee.

Background of the invention

The invention herein relates to the hose clamp art and specifically is directed to a hose clamp which has some form of structure which provides means for properly spacing a hose clamp relative to the end of a hose while at the same time securing the clamp to the hose so that the clamp may be secured to a length of hose before assembly of the length of hose with attached clamps to the apparatus with which it is to be used, such as in the cooling system of an internal combustion engine, for example. This statement of the field of the invention is applicable also to the invention disclosed and claimed in the third identified copending application Ser. No. 620,473 mentioned above.

The invention herein is applicable to hose clamps of the type which have bands as their tension members as opposed to wires, and as such the basic hose clamp which is modified in accordance with the invention in order to achieve the advantages of the invention, could be any of the many band-type hose clamps, such as for example those disclosed in U.S. Patents 1,584,332, 2,278,337, 2,321,930 and 3,086,270. An example of a wire hose clamp is disclosed in U.S. Patent 492,855. None of these, however, disclose spacing and securing structure.

Band type hose clamps which may be modified in order to achieve the invention include both radial and tangential screw types, although as will become apparent from the discussion hereinafter, the preferred form of the invention is one in which the means for securing and spacing is integral with a load diffusing member associated with a radial screw type of hose clamp.

In an effort to render the production line assembly of hoses to engines fool-proof, in recent times manufacturers have specified stapling of the clamps to hose ends. Since jigs or fixtures are provided for this operation, the clamps are properly spaced from the ends of the hose and the take-up screws or nuts are properly oriented circumferentially of the hose for ease of assembly and accessibility. The workman is given a quantity of hose lengths of proper shape and dimension with the clamps already secured in place. He mounts each assembly between the proper spuds or pipe ends and, providing the hose lengths are correctly cut and shaped and likewise have the clamps properly secured and positioned, the workman need only tighten the clamps. Theoretically this procedure eliminated the need for placing the clamps on the hose ends on the engine assembly line, spacing them properly from their respective ends and orienting them circumferentially to a desired location. Any or all of these steps could provide a source of error in judgment, resulting in breakage, leakage, destruction of parts, waste, etc.

The type of hose clamp which has been used thus far is that disclosed in U.S. Patent 492,855 mentioned above, this being a wire type or modification thereof, enabling the staple or staples to pass on opposite sides of the wire or wires and bite into the hose.

The reason that the advantages of stapled hose clamps were above categorized as attained "theoretically" is because many problems have developed out of the use of wire hose clamps stapled to lengths of hose. Wire hose clamps provide less pressure area than band type clamps; are easily shifted from stapled position during handling prior to use unless many staples are used; have a tendency to leak due to the piercing of the walls radially in the pressure areas; in all cases use tangential tightening instrumentalities and hence usually are not amenable to high torque application without distortion and/or breakage; and bite into soft hose destructively.

The invention solves these problems and provides additional advantages which will be indicated below.

Summary of the invention

The invention is characterized by the provision of a band type of hose clamp with either a radial or tangential tightening screw in which means are provided to enable the hose clamp to be secured to the end of a length of a hose in proper position to be utilized with a pipe end or spud to which the hose is secured. The means comprise a pair of sheet metal prongs formed on the band but preferably integral with a separate load distributing member the construction of which is disclosed in said copending application Ser. No. 549,980.

Each prong extends outwardly from the band edge and then inwardly radially thereof and has another angled portion with a sharp toothed end thereby providing a bight into which the hose end is adapted to be seated. Upon installing the hose clamp to the hose the sharp toothed end is pressed radially into the inner wall of the hose but at a location outside the pressure area on the radially inward surface thereof. The outer right angle portion of each prong has a length which is substantially equal to the wall thickness of the hose which is to be engaged by the hose clamp. The bight is spaced from the edge of the hose clamp by a distance to control spacing of the clamp from the hose end. When both prongs of the hose clamp are secured to the hose, and the hose end engaged in the bight, proper spacing and orientation of the hose clamp relative to the hose is effected.

The primary object of the invention is to provide a hose clamp which is adapted to be secured to a hose in proper position without providing the disadvantages of the stapled wire hose clamps.

More specifically the invention contemplates a hose clamp secured as stated in the object above which is of the band type, hence providing a substantial pressure area; a hose clamp which, when secured to the hose will not shift during the handling of the hose because of the large engagement area and the method of securing the clamp to the hose end with the said end firmly engaged in a pair of sheet metal prongs; a hose clamp in which no portion of the securement means pierces through or passes into the walls of the hose at the area of applied pressure; a hose clamp which may be of the radial screw type enabling the application of substantial tightening torque.

Other objects of the invention provide a novel hose clamp of the type described above in which there is a simply formed pronged member secured to the band to provide the spacing and securing means; to provide a novel hose clamp in which there is a load distributing member having the prongs referred to herein integral with said member enabling economical manufacture and construction of said hose clamp; to provide a pronged configuration associated with the hose clamp for the purposes described which is secured on the interior of the hose and hence not readily removed from the finally mounted hose clamp and hose without destruction thereof but removable for reuse when the hose is disassembled from its installed condition.

In connection with the last mentioned clause of the object above, it is pointed out that staples used in known wire hose clamps can be pulled out readily by objects accidentally or intentionally hooking thereon thus tearing the hose and destroying the staples. This is true even if the hose is detached from the engine or the like.

With respect to the hose clamp of the invention since the prongs are bent around the hose end and engaged into the interior of the wall the hose clamp cannot be removed without removing the clamp from the spud and then working the sharp prongs loose from the wall after which it is a relatively easy matter to remove the hose clamp without destruction of the hose. Further since the prongs engage in an area outside of the pressure area there is no likelihood of leakage or weakening of the hose wall at the pressure area.

Other advantages and objects will become apparent from the description of the preferred embodiments which follow in connection with which the attached drawing provides illustration of the same. The same or similar characters of reference will be used where practical to designate the same or equivalent structural elements or components.

Description of the preferred embodiments

Generally as mentioned above, the invention comprises a hose clamp in which the tension member is a flat band and in which a pair of reverse bent prongs is secured to the hose clamp, these prongs extending laterally from the edge of the hose clamp band by a distance which it is desired to secure the hose clamp from the end of the hose. These prongs are adapted to be engaged against the hose end and adapted thereafter to be bent into piercing engagement with the inner surface of the hose, entering the wall thereof, but outside of the pressure area.

The preferred embodiment has the prongs integral with a load distributing member and another form of the invention has the prongs formed on a small sheet metal clip which is secured to the band at any suitable location.

Figure 7:
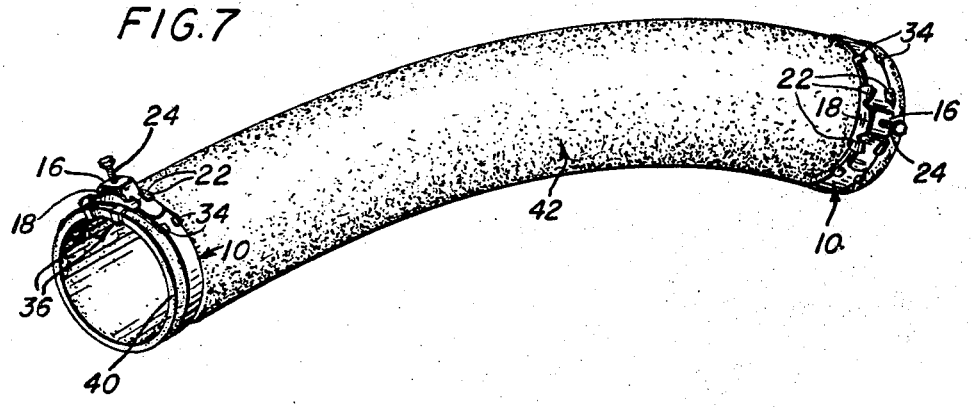
FIG. 7 is a perspective view of a length of hose having a pair of hose clamps secured respectively to the ends thereof in accordance with the invention.

FIG. 7 is a perspective view of a typical hose 42 of the type normally used in automobile and truck engines. These hoses are normally formed of a rubber-like material reinforced with fabric, wire and sometimes having preformed spring supports on the interior thereof. Since most internal combustion engines of today are manufactured on high speed production lines, heretofore hoses, such as the hose 42 are cut to length and shaped if necessary and furnished to the workmen on the line to assemble between a pair of pipe ends or spuds. The workman in the past has had a plurality of hose clamps and in the installation of the hose it was necessary for him to mount a hose clamp on each end, secure the hose 42 to the spud at both ends, adjust the clamp to the proper position and tighten it.

The above described procedure depends upon judgment and skill of the workman and hence furnishes a source of trouble. The hose clamp must be spaced properly from the end of the hose in order to engage properly the pipe ends so that the necessary pressure may be applied and likewise must be oriented circumferentially of the hose so that the fastening device is accessible after the engine has been assembled. For example in FIG. 3 the hose 42 is shown secured to a sheet metal spud 62 which in turn is mounted on some part of the vehicle engine such as for example a radiator wall 13. The wall 58 of the hose adjacent its axial end 46 is readily telescoped over the end of the spud 62 at the bead 15 but the location of the hose clamp 10 is not as easily assured. For best securement it is essential that the hose clamp be mounted so that the pressure is applied at the annular cylindrical area 44. It can be seen that if the hose clamp 10 is mounted by the workman either on the end bead 17 or even to the right thereof as viewed in FIG. 3 the securement will be faulty. Although the bulge 19 resulting from the end bead 17 is quite obvious in the drawing this is not always so, especially where the bead 17 is very small, and/or the hose 58 has very thick resilient walls, and/or there is no end bead 17.

Accordingly the invention herein provides a hose clamp which has means which properly spaces the hose clamp from the axial end 46 of the hose thereby assuring its securement over the pressure area 44 and likewise assuring proper orientation of the fastening instrumentality of the hose clamp, as will be described.

Figure 1:
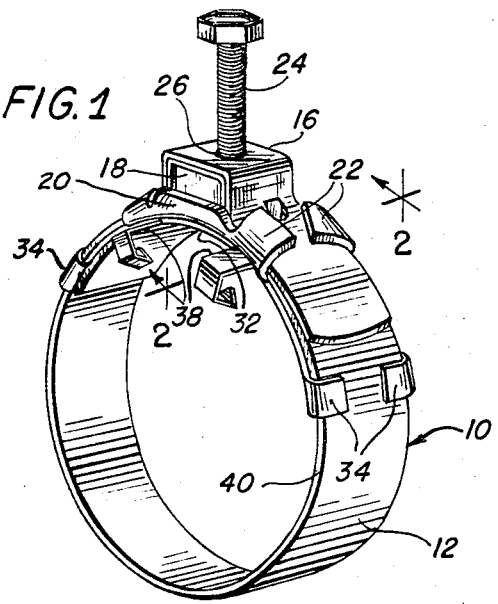
FIG. 1 is a perspective view of a hose clamp of the type having a load distributing member and constructed in accordance with the invention.

Referring now to FIG. 1 the hose clamp 10 is of the construction described in the first copending application Ser. No. 447,014. The flat band 12 which forms the tension member of the hose band has its free ends overlapped as shown at 14 to provide the formation 16 which houses the nut 18. The configuration of the formation 16 is retained by means of a bridging member 20 of heavier gauge than the band 12, such bridging member 20 being provided with clamping lugs 22 through which the overlapped ends 14 are pulled when the screw 24 is tightened. The screw 24 passes through suitable perforations 26 in the formation 16, is threaded through the nut 18 and engages a suitable thrust socket (not shown) formed in the bottom of the bridge member 20 as known in hose clamps of this type.

According to the copending application Ser. No. 447,014 there is a load distributing member 32 which is curved to fit the inside of the hose clamp 10 with its ends slidably secured to the band 12 by means of the bent-over ears 34.

Figure 5:
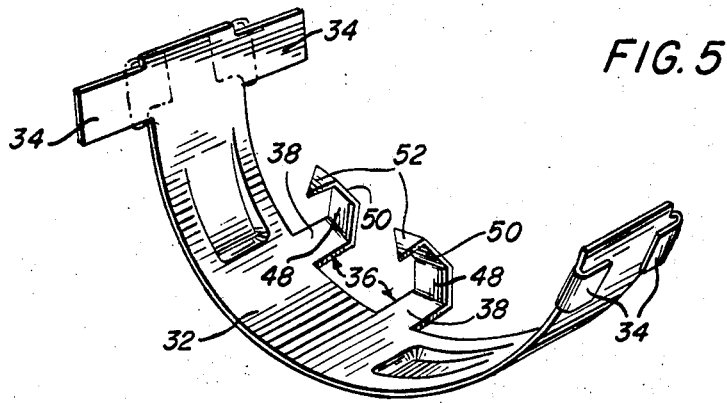
FIG. 5 is a perspective view of the bottom of the load distributing member of FIG. 4.

FIG. 5 shows the ears bent on the right side, and prior to bending on the left side, with phantom illustration of the ears when properly bent.

Spacing means are formed integral with the load distributing member 32 by providing laterally extending strips 36 somewhat as taught in said copending application Ser. No. 549,980; however the extensions 36 provide additional functions in the instant case, and hence are constructed somewhat differently from those of said application.

Figure 4:
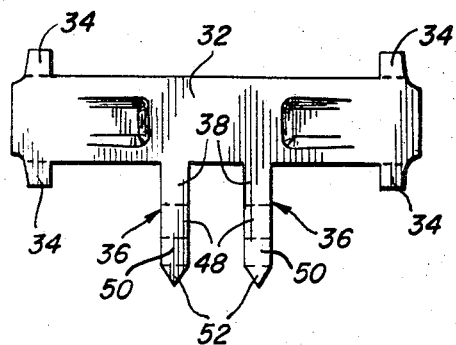
FIG. 4 is a plan developed view of the load-distributing member of the hose clamp of FIGS. 1–3.

There are four separate parts to each extension 36 and these are best seen in the developed view FIG. 4. The parts 38 closest to the load distributing member 32 function as spacing portions. These determine the distance which it is desired that the free edge 40 of the hose clamp be spaced from the end of the hose, such hose being shown at 42, its pressure area being shown at 44 and its axial end being designated 46. The dimension being referred to is the dimension D shown in FIG. 3.

Figure 3:
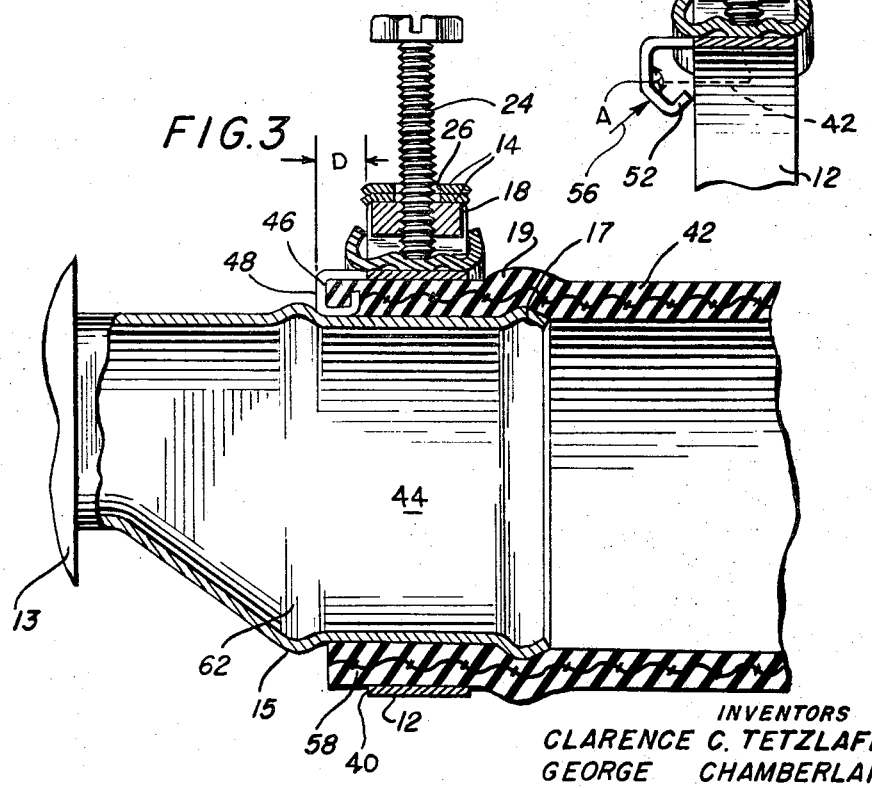
FIG. 3 is a view similar to that of FIG. 2 but in this case the hose clamp has been secured to a hose and the hose end installed on a spud.

The portions 48 represent the thickness of the hose since as will be seen this portion is engaged flat against the free end 46 of the hose as best shown in FIG. 3.

Figure 2:
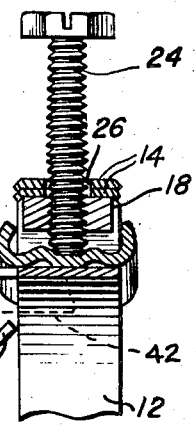
FIG. 2 is a sectional view through the same along the line 2—2 and in the direction indicated, the hose clamp in this case being free of the hose.

The next portions are 50 and these are of a length slightly less than the portions 48 as will be seen in FIGS. 1 and 5. When the hose clamp is manufactured and prior to its being secured to the hose these portions 50 are bent at an angle greater than 90° relative to the portions 48. The portions 48 and 38 are at right angles to one another and the portions 38 may be considered to lie in the same plane as the load distributing member 32, which of course is cylindrical as may best be seen in FIG. 5. The fourth portions of the extensions 36 comprise the sharp teeth 52 and these are bent at right angles relative to the portions 50. The angle A (FIG. 2) between the portions 50 and 48 is preferably great enough so that if the hose clamp is slipped over the end of the hose the teeth 52 will clear the inside wall of the hose. The phantom section of the hose wall in FIG. 2 indicates such clearance in installing the clamp.

When the hose clamp 10 is secured to the hose with the axial end 46 of the hose wall 58 bottomed against the portions 48 the spacing of the hose clamp edge 40 from said end 46 will be fixed. Thereafter the portions 50 are pressed inwardly by means of any suitable tool as indicated by arrow 56, causing these portions to rotate in a counter-clockwise direction as viewed in FIG. 2 with the teeth 52 biting into and entering the wall 58 as best shown in FIG. 3. Thereafter the hose 42 with hose clamps at opposite ends as shown in FIG. 7 may be handled readily without any danger of changing the orientation of the hose clamps relative to the hose or changing the spacing of the hose clamp relative to the ends of the hose.

When the hose 42 is secured to the spud 62 there is no portion of the extensions 36 either piercing or passing through or engaging the wall 58 of the hose at the pressure area 44 thereby decreasing a likelihood of leakage or damage to the hose and assuring that if removed and replaced the hose clamp will not contribute to a weakening of the hose or a tendency to leak.

Figure 6:
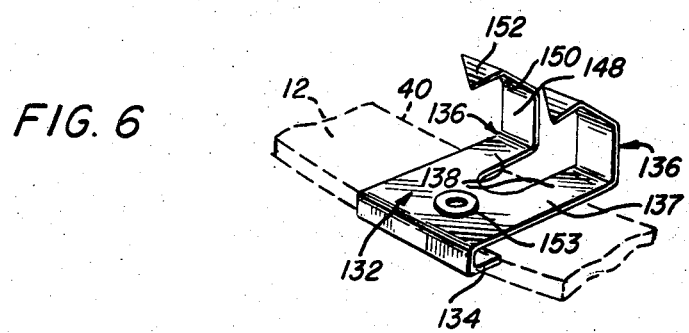
FIG. 6 is a fragmentary view showing another form of the invention.

In the event that it is not desired to use a hose clamp such as shown at 10 which includes a load distributing member 32, a clip may be formed of sheet metal as shown at 132 in FIG. 6. This clip 132 may have a hooked end 134 engaging an edge of the band 12 with the body of the clip flat against the inside of the band 12 as shown at 137. The same extensions 136 as the extension 36 described in the previous embodiment are provided on the clip 132, having portions 138, 148, 150 and 152 for the same purposes as the portions 38, 48, 50 and 52 respectively. The clip 132 is secured to the band 12 by means of a suitable rivet or grommet 153 piercing perforations provided on the clip 132 and the band 12.

In the preferred embodiment which is illustrated in FIGS. 1–5 herein, it is intended that the hose clamp be of the type having a load distributing member and in this case of course the tightening screw 24 is radial. Other types of hose clamps in which the tension member 12 is a flat band may be used as described in connection with FIG. 6 in which case the tightening instrumentality may either be a radial or a tangential screw.

It is contemplated that variations in certain structural features of the embodiments of the invention described and illustrated may occur to the skilled artisan to achieve the same desired advantages and functions. For example, hose-engaging elements can be struck from the portions 50, 150 as substitutes for the reverse bent pointed ends or tines 52, 152. Such hose engaging elements may take the form of ribs or barbs designed to pierce the wall of the hose or otherwise achieve the desired purchase therewith sufficient to fix the positioning of the clamp and prevent circumferential movement thereof relative to the hose.

What it is desired to secure by Letters Patent of the United States is:

1. A hose clamp having a generally circular tension member, means for securing said hose clamp to a hose at a predetermined location spaced from an end of the hose comprising, spacing and securing means connected with said clamp and extending laterally of the tension member edge in an axial direction, said spacing and securing means comprising a pair of spaced flat metal prongs each having one part connected with and lying generally in the plane of the tension member and having a radially inwardly extending generally right-angle bent second part connected to said one part and spaced from the tension member edge by a predetermined distance, the radial length of the right-angle bent second part being substantially the thickness of the wall of the hose to which the clamp is adapted to be secured, each prong also having a third part connected to said second part as a continuation thereof, but bent at an angle thereto and extending in a direction toward the tension member edge so that the second part forms a bight between the first and third parts, and a fourth part integral with the third part and formed as an extension thereof at generally right angle thereto in a direction radially outward of the hose clamp and having a sharp point, the angle between the second and third parts being substantially greater than a right angle to enable the hose clamp to be engaged over a hose end with the axial end of the hose engaged in the bight, but adapted to be decreased so as to drive the sharp point of the fourth part into the inner wall surface of the hose in a radially outward direction to secure the clamp to the hose.

2. A hose clamp as claimed in claim 1 in which the length of the first part is greater than the length of the third part so that the point of the fourth part will engage the hose to which the clamp is adapted to be secured at a location outside of the area of the hose which will be directly beneath the tension member when the clamp is secured thereon.

3. A hose clamp as claimed in claim 1 in which said spacing and securing means are connected with a separate member that is attached to the hose clamp tension member.

4. A hose clamp as claimed in claim 1 in which said tension member is a flat and imperforate band.

5. A hose clamp as claimed in claim 4 in which the hose clamp is of the radial screw type having overlapped band ends, a bridge member with guiding ears, a nut above the bridge engaged by the screw through suitable perforations in the overlapped band ends and adapted to constrict the band when the screw is driven into the nut, and a loosely mounted load diffusing member on the interior of the hose clamp beneath the bridge, and in which the spacing and securing means are integral with said load diffusing member.

6. A hose clamp of the radial screw type and having a bridge member with a slidable load-diffusing, arcuate member mounted to the hose clamp below the bridge, means for securing and spacing the hose clamp relative to a hose end formed integral with said load-diffusing member, comprising sharp-ended hook means integral with said load diffusing member and extending laterally thereof, said hook means including a hose engaging bight spaced from the load-diffusing member and a reverse-bent tine adapted to be pressed into engagement with the inner wall surface of the hose in a generally radially outward direction to secure the hose clamp to the hose.

7. The hose clamp of claim 6 in which said hook means has two bights and tines spaced apart along the circumferential edge of said load distributing member.

8. A hose clamp having a flat, generally circular tension band, means for securing said hose clamp to a hose at a predetermined location spaced from an end of the hose comprising, spacing and securing means connected with said clamp and extending laterally of the band edge in an axial direction, said spacing and securing means comprising at least one flat metal prong having one part connected with and lying generally in the plane of the band and having a radially inwardly extending generally right-angle bent second part connected to said one part and spaced from the band edge by a predetermined distance, the radial length of the right-angle bent second part being substantially the thickness of the wall of the hose to which the clamp is adapted to be secured, said prong also having a third part connected to said second part as a continuation thereof, but bent at an angle thereto and extending in a direction toward the band edge so that the second part forms a bight between the first and third parts, means integral with said third part located to engage against the hose, the angle between the second and third parts being substantially greater than a right angle to enable the hose clamp to be engaged over a hose end with the end of the hose engaged in the bight, said prong being deformable such that said hose end can be clamped between said first and third parts with said means on the third part so engaging the inner wall of the hose as to fix the circumferential position of said clamp relative to said hose.

9. A hose clamp as defined in claim 8 in which said integral means comprise a tine formation arranged to pierce the hose upon engagement therewith.

10. A hose clamp as defined in claim 8 wherein said spacing and securing means includes a pair of spaced flat metal prongs.

11. A hose clamp as defined in claim 8 wherein said clamp is of the radial screw type and includes a bridge member and a slidable load-diffusing, arcuate member mounted to the hose clamp below said bridge, and said spacing and securing means is integral with said arcuate, load diffusing member.

12. In combination, a hose and hose clamp assembly comprising a length of hose having an annular end portion adapted to receive a suitable fitting on its interior to establish a fluid-tight connection therewith and at least one clamp adapted to be secured over the end portion to secure said hose against said fitting, said hose clamp having a generally circular tension member, means for securing said clamp to said end portion at a predetermined location thereon, spacing and securing means connected with said clamp and extending laterally of the tension member in an axial direction thereof, said spacing and securing means comprising at least a pair of spaced flat metal prongs each having one part connected with and lying generally in the plane of the tension member and having a radially inwardly extending generally right-angle bent second part connected to said one part and spaced from the tension member edge by a predetermined distance, the radial length of the right-angle bent second part being substantially the thickness of the wall of the hose, each prong also having a third part connected to said second part as a continuation thereof, but bent at an angle thereto and extending in a direction toward the tension member edge so that the second part forms a bight between the first and third parts, and a fourth part integral with the third part and formed as an extension thereof at generally right angle thereto in a direction radially outward of the hose clamp and having a sharp point, said fourth part being bent into piercing engagement with the interior of said end portion to retain said clamp in fixed position during assembly of said combination.

13. The combination as claimed in claim 12 in which said spacing and securing means are integral with a separate member that is attached to the hose clamp tension member.

References Cited

UNITED STATES PATENTS

| | | | |
|---|---|---|---|
| 1,012,345 | 12/1911 | Ferguson | 285—8 XR |
| 1,282,845 | 10/1918 | Johnson | 85—49 X |
| 1,354,669 | 10/1920 | Levedahl | 285—253 XR |
| 1,426,086 | 8/1922 | Lowrey | 285—253 XR |
| 2,183,175 | 12/1939 | Tetzlaff | 24—278 |
| 2,208,706 | 7/1940 | Spencer | 285—253 |
| 2,451,062 | 10/1948 | Booth | 24—279 XR |
| 2,586,640 | 2/1952 | Furman | 138—99 |
| 3,321,811 | 5/1967 | Thomas | 285—252 XR |
| 3,365,218 | 1/1968 | Denyes | 285—253 |

DONALD A. GRIFFIN, *Primary Examiner.*